United States Patent
Okuno et al.

(10) Patent No.: US 11,262,193 B2
(45) Date of Patent: Mar. 1, 2022

(54) THREE-DIMENSIONAL MEASUREMENT DEVICE, SENSOR DEVICE FOR THREE-DIMENSIONAL MEASUREMENT, AND METHOD FOR PERFORMING CONTROL IN THREE-DIMENSIONAL MEASUREMENT DEVICE

(71) Applicant: OMRON Corporation, Kyoto (JP)

(72) Inventors: Motoharu Okuno, Fukuchiyama (JP); Hitoshi Nakatsuka, Kawanishi (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/052,520

(22) PCT Filed: May 30, 2019

(86) PCT No.: PCT/JP2019/021496
§ 371 (c)(1),
(2) Date: Nov. 2, 2020

(87) PCT Pub. No.: WO2019/239905
PCT Pub. Date: Dec. 19, 2019

(65) Prior Publication Data
US 2021/0262786 A1    Aug. 26, 2021

(30) Foreign Application Priority Data

Jun. 13, 2018 (JP) .............................. JP2018-112506

(51) Int. Cl.
*G01B 11/25* (2006.01)
*G02B 7/04* (2021.01)

(52) U.S. Cl.
CPC ........ *G01B 11/254* (2013.01); *G01B 11/2513* (2013.01); *G02B 7/04* (2013.01)

(58) Field of Classification Search
None
See application file for complete search history.

(56) References Cited

U.S. PATENT DOCUMENTS

2019/0376784 A1* 12/2019 Tewes ................ G01B 11/2513

FOREIGN PATENT DOCUMENTS

| CN | 208171197 U | * 11/2018 |
| JP | H06505096 | 6/1994 |

(Continued)

OTHER PUBLICATIONS

"International Search Report (Form PCT/ISA/210)" of PCT/JP2019/021496, dated Jun. 25, 2019, with English translation thereof, pp. 1-3.

(Continued)

*Primary Examiner* — Michael P Stafira
(74) *Attorney, Agent, or Firm* — JCIPRNET

(57) ABSTRACT

This three-dimensional measurement device includes: a light source, a lens guiding light from the light source to a subject, a photomask disposed on the optical axis between the light source and lens and having a predetermined pattern, a driving device changing the position of one member from the lens and photomask or changing an optical characteristic of the lens, and a control unit controlling the driving device. The control unit fixes an image formation position for light/dark pattern light formed by the photomask at the position of the subject by fixing the position of said member or the optical characteristic of the lens when specifying a first mode, and varies the position of the member or the optical characteristic of the lens to vary the image formation position for the light/dark pattern light such that the light/dark difference caused by the light/dark pattern light is smaller than in the first mode when specifying a second mode.

10 Claims, 15 Drawing Sheets

(56) References Cited

FOREIGN PATENT DOCUMENTS

| | | | | | |
|---|---|---|---|---|---|
| JP | H0749404 | A | * | 2/1995 | |
| JP | 2001100104 | | | 4/2001 | |
| JP | 2007294564 | | | 11/2007 | |
| JP | 2012079294 | | | 4/2012 | |
| JP | 2017037089 | | | 2/2017 | |
| JP | 2020106480 | A | * | 7/2020 | ............ G01B 11/24 |
| WO | 2015145687 | | | 10/2015 | |

OTHER PUBLICATIONS

"Written Opinion of the International Searching Authority (Form PCT/ISA/237)" of PCT/JP2019/021496, dated Jun. 25, 2019, with English translation thereof, pp. 1-6.
"Office Action of Japan Counterpart Application" with English translation thereof, dated Oct. 26, 2021, p. 1-p. 6.

* cited by examiner

THREE-DIMENSIONAL MEASUREMENT DEVICE, SENSOR DEVICE FOR THREE-DIMENSIONAL MEASUREMENT, AND METHOD FOR PERFORMING CONTROL IN THREE-DIMENSIONAL MEASUREMENT DEVICE

CROSS-REFERENCE TO RELATED APPLICATION

This application is a 371 application of the International PCT application serial no. PCT/JP2019/021496, filed on May 30, 2019, which claims the priority benefit of Japanese Patent Application No. 2018-112506, filed on Jun. 13, 2018. The entirety of each of the above-mentioned patent applications is hereby incorporated by reference herein and made a part of this specification.

BACKGROUND

Technical Field

The present invention relates to a three-dimensional measurement device, a sensor device for three-dimensional measurement, and a method for performing control in a three-dimensional measurement device.

Background Art

Since the past, three-dimensional measurement devices capable of executing inspection including the height of an object to be inspected have been known. For example, as such a three-dimensional measurement device, Japanese Patent Laid-Open No. 2012-79294 (Patent Literature 1) discloses a device that performs three-dimensional measurement by detecting a predetermined pattern from an image captured by projecting a predetermined pattern.

CITATION LIST

Patent Literature

Patent Literature 1: Japanese Patent Application Laid-Open No. 2012-79294

SUMMARY

Technical Problem

The device disclosed in Patent Literature 1 cannot perform image capturing (image capturing for two-dimensional measurement) under uniform illumination because image capturing is performed in a state in which a predetermined pattern is projected.

The present disclosure was contrived in view of the above problem, and an objective thereof is to provide a three-dimensional measurement device, a sensor device for three-dimensional measurement, and a method for performing control in a three-dimensional measurement device that make it possible to perform irradiation with light that is more uniform than irradiation light used during three-dimensional measurement.

Solution to Problem

According to an aspect of the present disclosure, a three-dimensional measurement device includes: a light source; a lens that guides light from the light source to a subject; a photomask which is disposed on an optical axis between the light source and the lens and has a predetermined pattern formed thereon; a driving device that varies a position of at least one member of the lens and the photomask or optical characteristics of the lens; and a control unit that controls the driving device. The control unit has a first mode and a second mode. When the first mode is specified, the control unit fixes the position of the member or the optical characteristics of the lens to fix an image formation position for light/dark pattern light formed by the photomask at a position of the subject. When the second mode is specified, the control unit performs control for varying the position of the member or the optical characteristics of the lens to vary the image formation position for the light/dark pattern light so that a light/dark difference caused by the light/dark pattern light is smaller than in the first mode.

According to such a configuration, control for varying the position of a member of driving target or the optical characteristics of a lens is performed in the second mode, so that it is possible to make the light/dark difference caused by the light/dark pattern light smaller than in the first mode. Therefore, in the second mode, it is possible to perform image capturing (image capturing for two-dimensional measurement) under more uniform illumination than in the first mode.

Preferably, the control unit moves the member in a direction perpendicular to the optical axis in the second mode.

According to such a configuration, it is possible to make the light/dark difference caused by the light/dark pattern light smaller than in the first mode.

Preferably, the control unit vibrates the member in the direction perpendicular to the optical axis in the second mode.

According to such a configuration, it is possible to make the light/dark difference caused by the light/dark pattern light smaller than in the first mode.

Preferably, a plurality of element patterns is disposed in a plane in the pattern. An amplitude of the vibration is larger than a width of the element pattern in a direction of the amplitude.

According to such a configuration, it is possible to make a light/dark difference smaller than in a configuration whose amplitude is smaller than the width of the element pattern. Therefore, it is possible to irradiate a subject with more uniform light than in a configuration whose amplitude is smaller than the width of the element pattern.

Preferably, the three-dimensional measurement device further includes an image capturing unit that captures an image of the subject in a state in which the pattern is projected onto the subject. A period of the vibration is shorter than an exposure time in the image capturing.

According to such a configuration, it is possible to make a light/dark difference smaller than in a configuration whose vibration period is longer than the exposure time. Therefore, it is possible to irradiate a subject with more uniform light than in a configuration whose period is longer than the exposure time.

Preferably, when the second mode is specified, the control unit moves the member in a direction along the optical axis.

According to such a configuration, it is possible to make the light/dark difference caused by the light/dark pattern light smaller than in the first mode.

Preferably, the three-dimensional measurement device further includes an image capturing unit that captures an image of the subject in a state in which the pattern is projected onto the subject. On a condition that the first mode is specified, the control unit detects a pattern appearing in a captured image of the subject and measures a three-dimensional shape of the subject based on a result of the detection. An amount of movement of the member in the direction along the optical axis when the second mode has been specified is set so that an image formation position in the second mode falls outside a measurement range in measurement of the three-dimensional shape when the first mode has been specified.

According to such a configuration, it is possible to make a light/dark difference smaller than when the image formation position in the second mode falls within the measurement range. Therefore, it is possible to irradiate a subject with more uniform light than when the image formation position in the second mode falls within the measurement range.

Preferably, the lens is a liquid lens that varies a focal length in accordance with a driving voltage to be applied. The driving device is a driving circuit that applies the driving voltage to the liquid lens. The driving device maintains the driving voltage to be a constant value in the first mode. The driving device fluctuates the driving voltage in the second mode.

According to such a configuration, it is possible to vary the optical characteristics of a lens by controlling the driving voltage to be applied to the liquid lens.

According to another aspect of the present disclosure, a sensor device for three-dimensional measurement includes: a light source; a lens that guides light from the light source to a subject; a photomask which is disposed on an optical axis between the light source and the lens and has a predetermined pattern formed thereon; and a driving device that varies a position of at least one member of the lens and the photomask or optical characteristics of the lens. The sensor device fixes the position of the member or the optical characteristics of the lens, in a first mode, to fix an image formation position for light/dark pattern light formed by the photomask at a position of the subject. The sensor device varies the position of the member or the optical characteristics of the lens by the driving device, in a second mode, to vary the image formation position for the light/dark pattern light so that a light/dark difference caused by the light/dark pattern light is smaller than in the first mode.

According to such a configuration, control for varying the position of a member of driving target or the optical characteristics of a lens is performed in the second mode, so that it is possible to make the light/dark difference caused by the light/dark pattern light smaller than in the first mode. Therefore, in the second mode, it is possible to perform image capturing (image capturing for two-dimensional measurement) under more uniform illumination than in the first mode.

According to still another aspect of the present disclosure, a control method is executed in a three-dimensional measurement device. The three-dimensional measurement device includes a lens that guides light from a light source to a subject and a photomask which is disposed on an optical axis between the light source and the lens and has a predetermined pattern formed thereon. The three-dimensional measurement device varies a position of at least one member of the lens and the photomask or optical characteristics of the lens. The control method includes: a step of accepting a specification of any of a first mode and a second mode; a step of fixing the position of the member or the optical characteristics of the lens based on the first mode having been specified to fix an image formation position for light/dark pattern light formed by the photomask at a position of the subject; and a step of performing control for varying the position of the member or the optical characteristics of the lens based on the second mode having been specified to vary the image formation position for the light/dark pattern light so that a light/dark difference caused by the light/dark pattern light is smaller than in the first mode.

According to such a method, control for varying the position of a member of driving target or the optical characteristics of a lens is performed in the second mode, so that it is possible to make the light/dark difference caused by the light/dark pattern light smaller than in the first mode. Therefore, in the second mode, it is possible to perform image capturing (image capturing for two-dimensional measurement) under more uniform illumination than in the first mode.

Advantageous Effects of Invention

According to the present disclosure, in the second mode, it is possible to perform image capturing under more uniform illumination than in the first mode.

DESCRIPTION OF EMBODIMENTS

Figure 1:
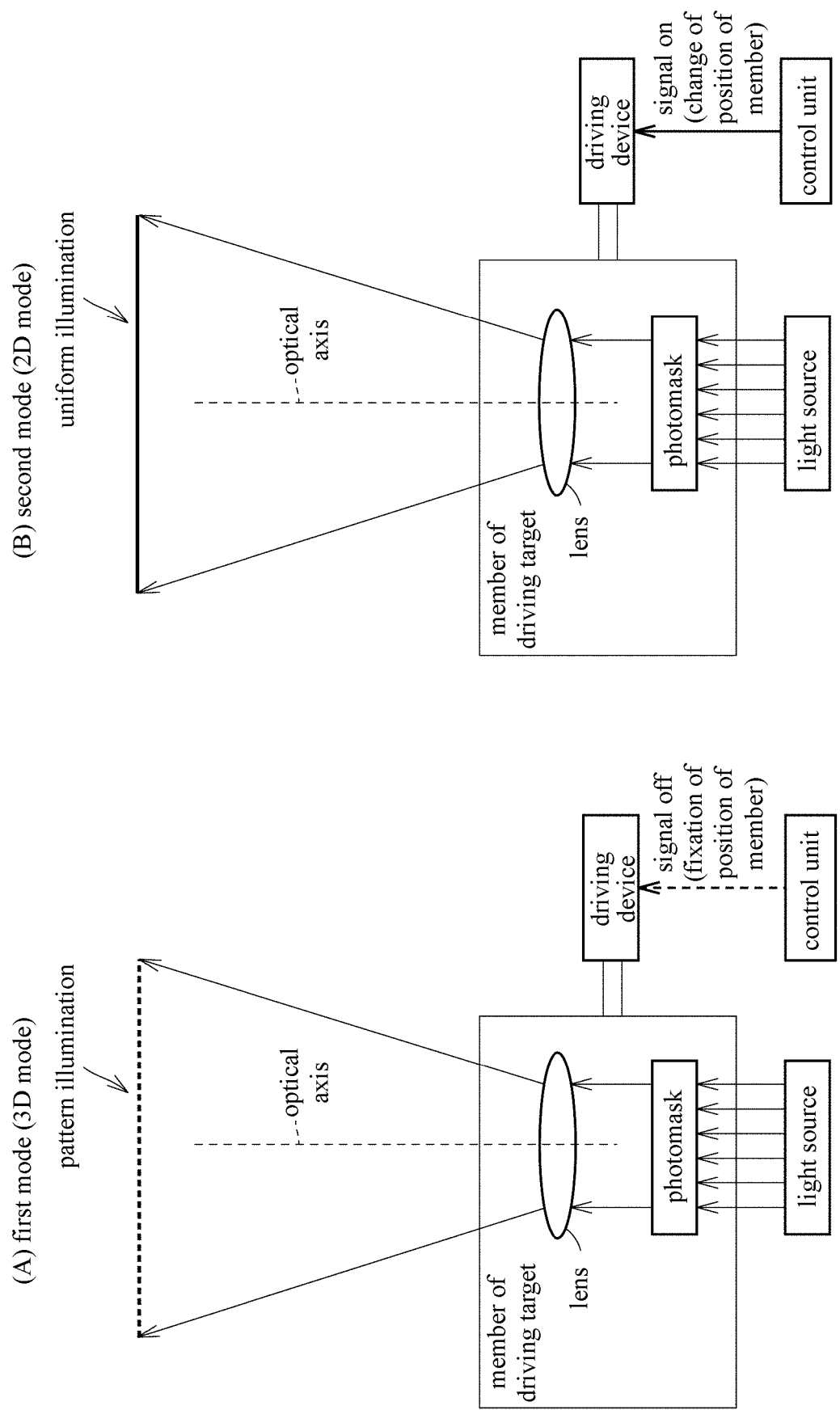
FIG. 1 is a diagram illustrating an outline of processing in a three-dimensional measurement device.

Hereinafter, an embodiment of the present invention will be described with reference to the accompanying drawings. In the following description, the same components are denoted by the same reference numerals and signs. The names and functions thereof are also the same other. Therefore, detailed description thereof will not be repeated.

1. Application Example

FIG. 1 is a diagram illustrating an outline of processing in a three-dimensional measurement device. In this example, the three-dimensional measurement device performs three-dimensional measurement using a spatial coding method.

As shown in FIG. 1, the three-dimensional measurement device includes a light source, a photomask, a lens, a driving device, and a control unit.

The lens guides light from the light source to a subject. The photomask is disposed on an optical axis between the light source and the lens, and has a predetermined pattern formed thereon. The driving device varies the position of at least one member of the lens and the photomask (hereinafter also referred to as a "member of driving target").

The control unit controls the driving device. Specifically, the control unit has a first mode (3D mode) and a second mode (2D mode).

When the first mode is specified, the control unit fixes the position of a member of driving target, as shown in a state (A), to fix an image formation position for light/dark pattern light (pattern illumination light or spatial pattern light) formed by the photomask at the position of a subject.

When a second mode is specified, the control unit performs control for varying the position of the member of driving target, as shown in a state (B), to vary the image formation position for the light/dark pattern light so that a light/dark difference is smaller than in the first mode (so that, preferably, a change in spatial brightness caused by the light/dark pattern light does not occur on the surface of the subject).

In the first mode, three-dimensional measurement can be executed. Specifically, the three-dimensional measurement device captures an image of the subject in a state in which the light/dark pattern light is projected onto the subject in the first mode. Further, the three-dimensional device detects a pattern appearing in the captured image of the subject, and measures a three-dimensional shape of the subject based on the detection result.

In addition, in the second mode, it is possible to make the light/dark difference caused by the light/dark pattern light smaller than in the first mode by performing control for varying the position of the member of driving target. Therefore, in the second mode, it is possible to perform image capturing (image capturing for two-dimensional measurement) under more uniform illumination than in the first mode.

In addition, when the second mode has been specified, the same effect can also be obtained by the driving device varying the optical characteristics of the lens instead of varying the position of the member of driving target.

2. Configuration Example

[Embodiment 1]

<A. System Configuration>

Figure 2:
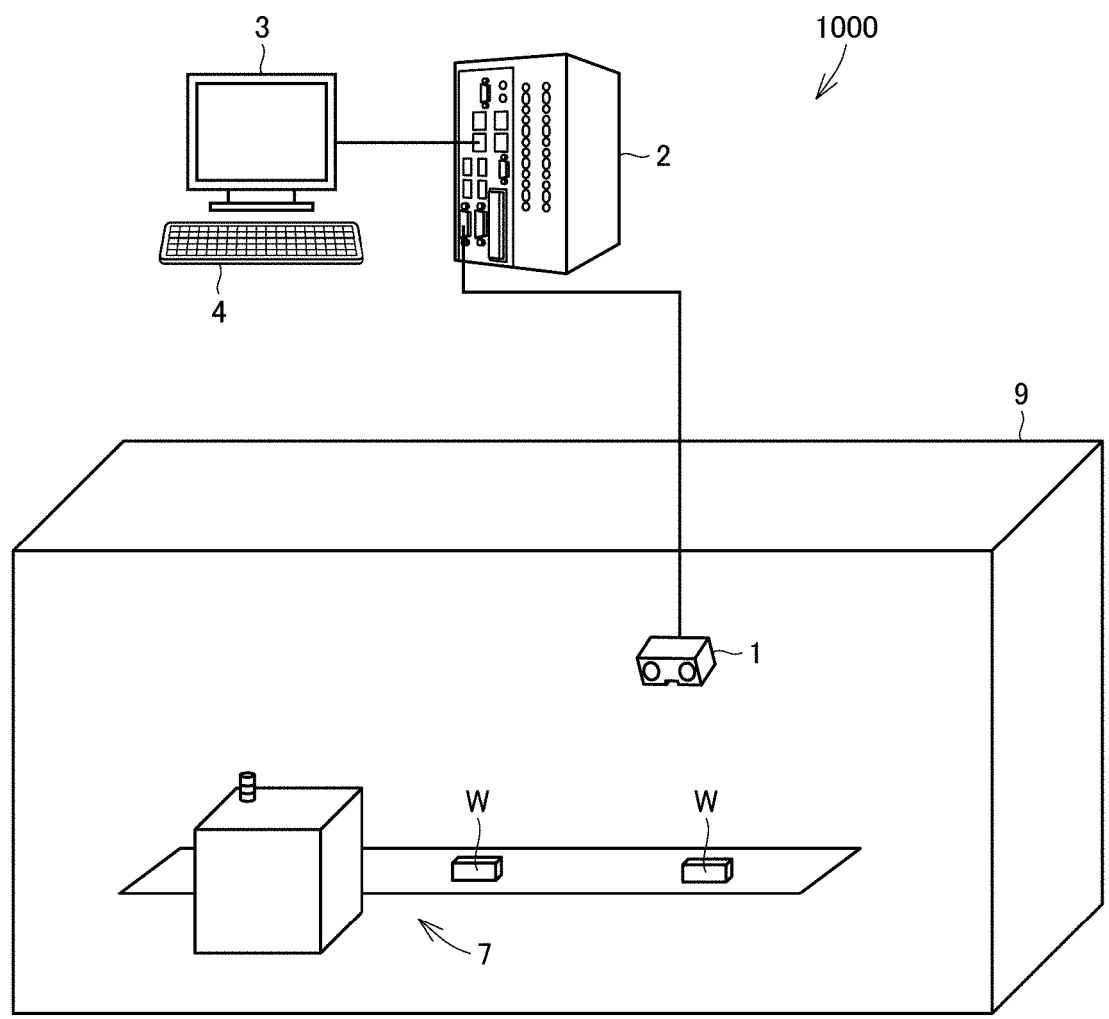
FIG. 2 is a diagram illustrating a schematic configuration of the three-dimensional measurement device.

FIG. 2 is a diagram illustrating a schematic configuration of a three-dimensional measurement device 1000.

Referring to FIG. 2, the three-dimensional measurement device 1000 includes a 3D (dimensions) measurement sensor 1, an image processing device 2, a display 3, and a keyboard 4. The image processing device 2 is also referred to as a sensor controller or a visual sensor.

The 3D measurement sensor 1 is communicably connected to the image processing device 2. The image processing device 2 is connected to the display 3. The keyboard 4 is connected to the image processing device 2.

The 3D measurement sensor 1 is typically installed within a building 9. The 3D measurement sensor 1 captures an image of an object (subject) such as a facility. Meanwhile, this example shows a state in which workpieces W are being transported on a conveyor. Captured images including the workpieces W and the vicinities of the workpieces W are obtained by capturing an image of the object.

Although this will be described in detail later, the three-dimensional measurement device 1000 performs three-dimensional measurement on a subject using a spatial coding method.

<B. 3D Sensor>

Figure 3:
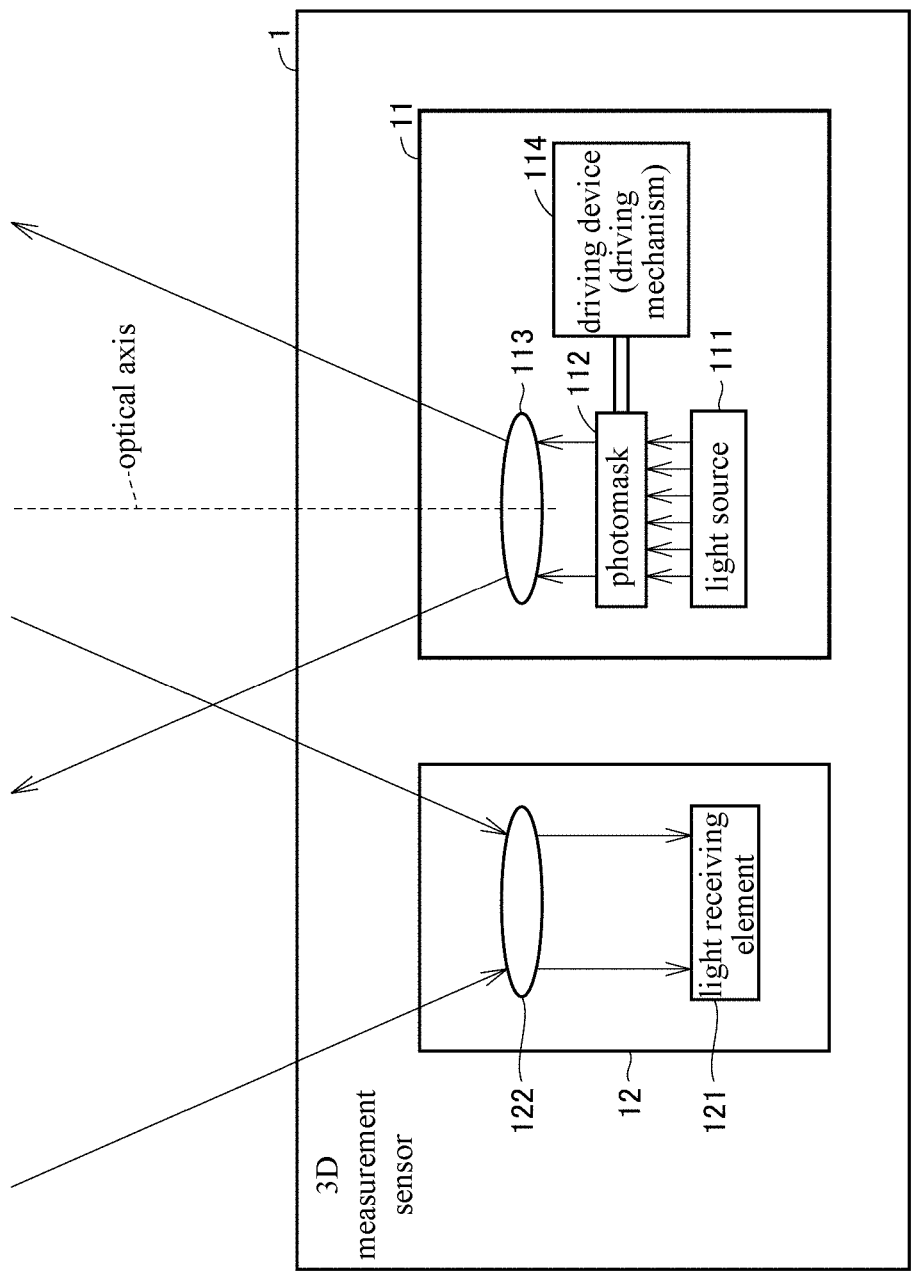
FIG. 3 is a diagram illustrating a schematic configuration of a 3D measurement sensor.

FIG. 3 is a diagram illustrating a schematic configuration of the 3D measurement sensor 1.

Referring to FIG. 3, the 3D measurement sensor 1 includes a projection unit 11 and an image capturing unit 12.

The projection unit 11 includes a light source 111, a photomask 112, a lens 113, and a driving device 114. The image capturing unit 12 includes a light receiving element 121 and a lens 122.

The light source 111 irradiates the photomask 112 with light of a predetermined wavelength. A predetermined pattern is formed on the photomask 112. Light having passed through the photomask 112 is radiated to the outside through the lens 113. Thereby, a spatial pattern is projected into an external space.

The image capturing unit 12 captures an image of a subject onto which the spatial pattern has been projected. Specifically, a captured image is obtained by the light receiving element 121 receiving light having passed through the lens 122.

Figure 6:
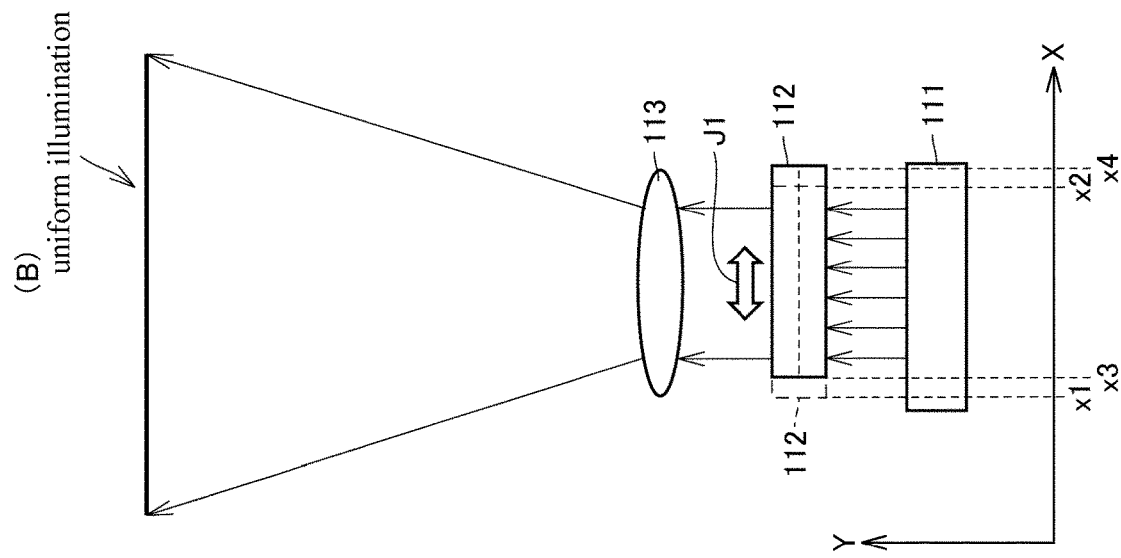
FIG. 6 is a diagram illustrating a method of generating uniform illumination.
Figure 6:
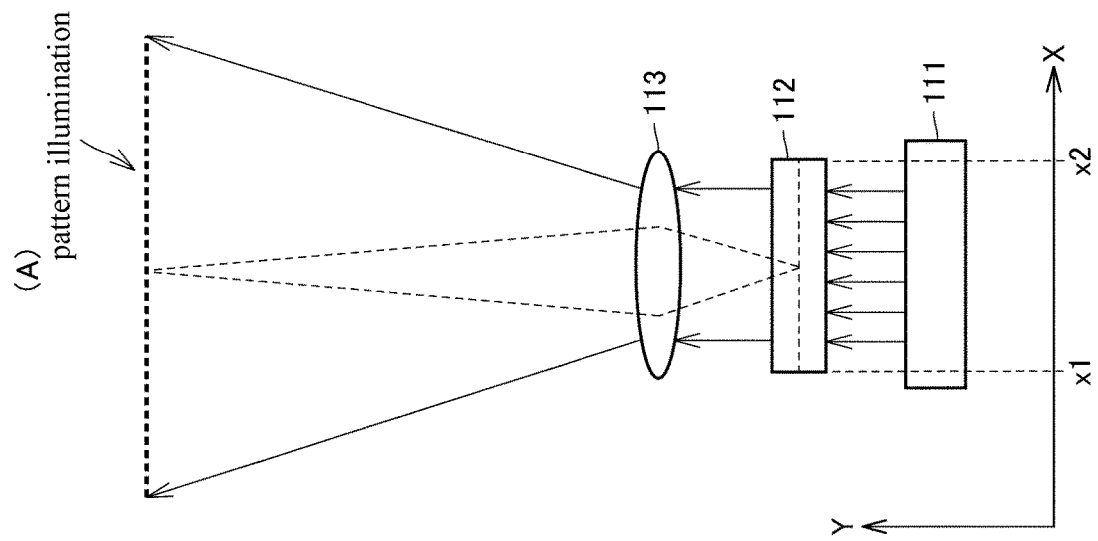
Figure 9:
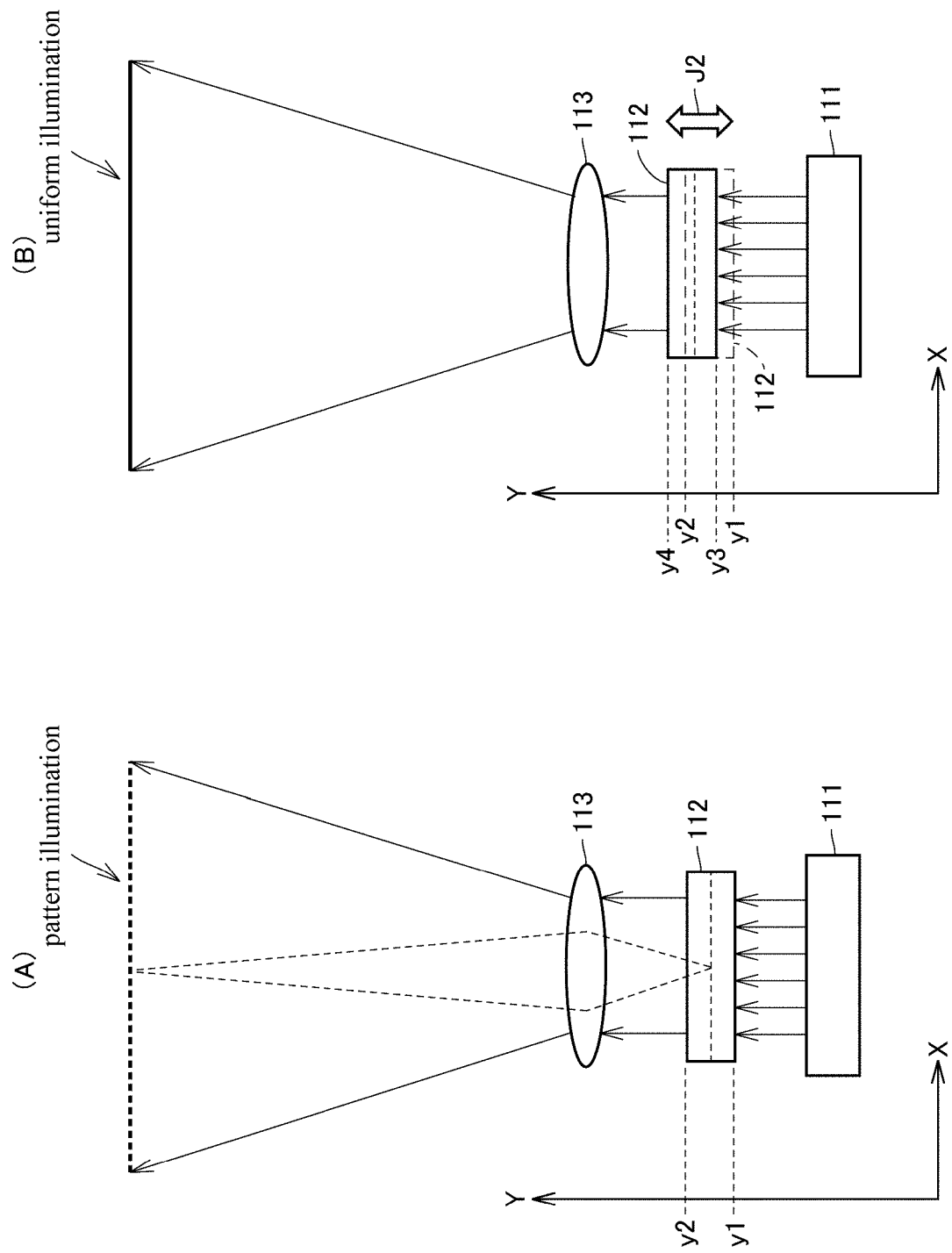
FIG. 9 is a diagram illustrating another method of generating uniform illumination.

The driving device 114 is specifically a driving mechanism. The driving device 114 drives the photomask 112 based on instructions from the image processing device 2. The driving device 114 varies the position of the photomask 112. Typically, the driving device 114 periodically varies the position of the photomask 112 by vibrating the photomask 112 with a predetermined period. The movement direction (specifically, amplitude direction) of the photomask 112 will be described later (FIGS. 6 and 9).

<C. Spatial Coding Method>

A spatial coding method which is used in the three-dimensional measurement device 1000 will be described.

(c1. Principle)

Figure 4:
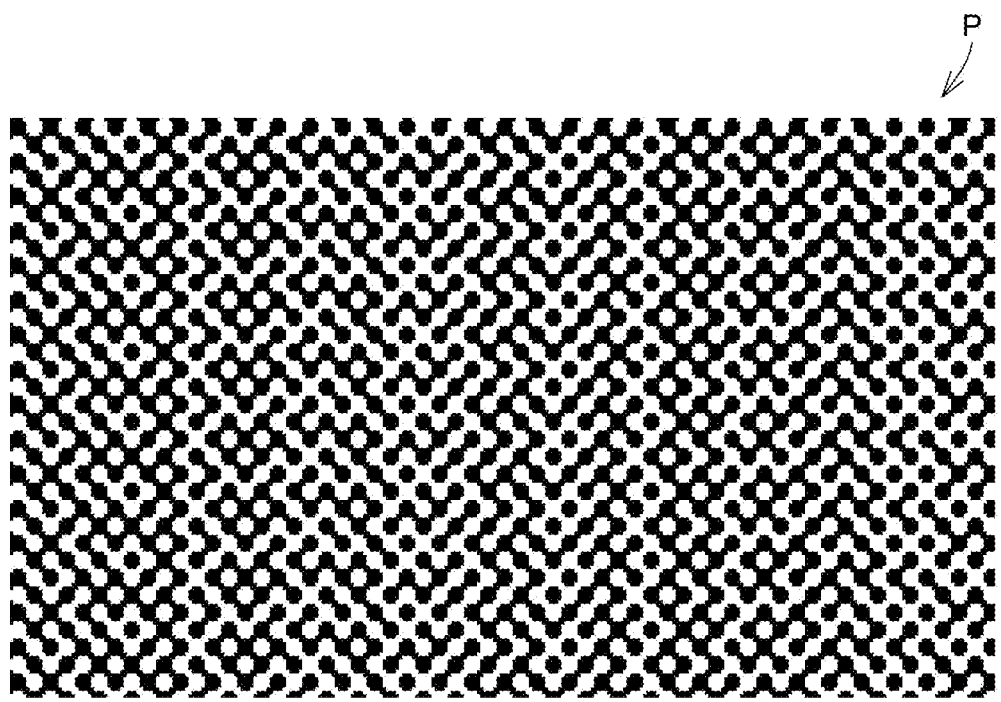
FIG. 4 is a diagram illustrating an example of a spatial pattern.

FIG. 4 is a diagram illustrating an example of a spatial pattern. A spatial pattern P is generated by light from the light source 111 passing through the photomask 112.

The spatial pattern P is projected onto a subject. The image capturing unit 12 captures an image of the subject in a state in which the spatial pattern P has been projected onto the subject.

Figure 5:
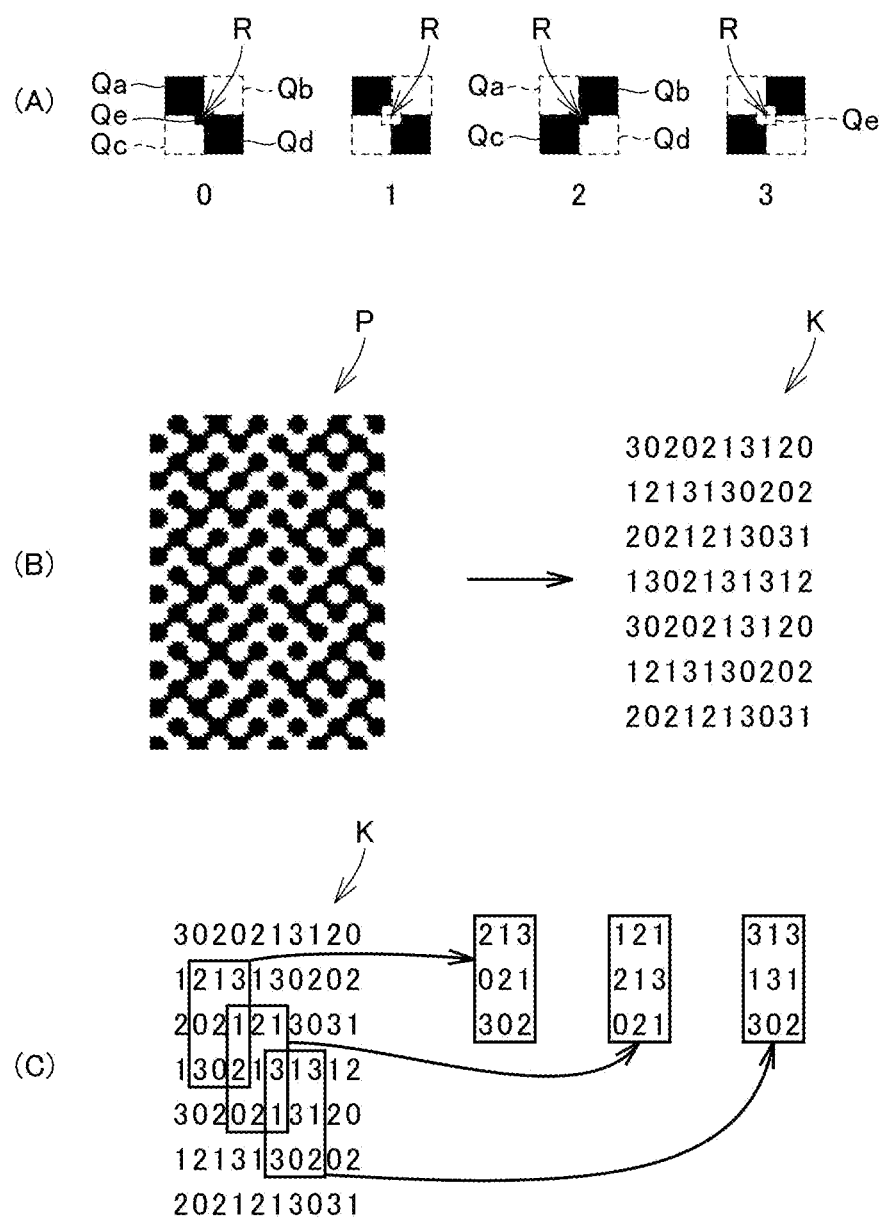
FIG. 5 is a diagram illustrating a measurement principle of a spatial coding method.

FIG. 5 is a diagram illustrating a measurement principle of a spatial coding method.

Part (A) of FIG. 5 is a diagram illustrating four types of codes. Four numerical value of 0 to 3 can be represented by the four types of codes.

Referring to part (A) of FIG. 5, each of the codes is constituted by four large squares Qa, Qb, Qc, and Qd and one small square Qe located at the central portion. Each of the squares Qa to Qd is disposed so that the central position R of the code is located at a corner. The central position R is also the central position of the small square Qe.

The four large squares Qa, Qb, Qc, and Qd are referred to as "grids." The small square Qe located at the intersection point between the grids is referred to as a "primitive." As will be described later, four types of codes are represented in combination with two types of grids and two types of primitives.

When the upper left square Qa is black, the value of a predetermined variable p1 is set to 0 (p1=0). When the square Qa is white, the value of the variable p1 is set to 1 (p1=1).

When the color of the central small square Qe is black, the value of a predetermined variable p0 is set to 0 (p0=0). When the color of the square Qe is white, the value of the variable p0 is set to 1 (p0=1). Further, the sum of 2p1 and p0 (2p1+p0) is set as the value of a code.

For example, when the square Qa is black and the square Qe is black, the value of the code is set to "0." When the square Qa is black and the square Qe is white, the value of the code is set to "1." When the square Qa is white and the square Qe is black, the value of the code is set to "2." When the square Qa is white and the square Qe is white, the value of the code is set to "3."

In this manner, four numerical values of "0," "1," "2," and "3" can be represented by the four types of codes.

FIG. 5(B) is a diagram illustrating a matrix equivalent to a portion of the spatial pattern P (see FIG. 4). Referring to FIG. 5(B), the type of each code of the projected spatial pattern is represented by a numerical value, so that a matrix K equivalent to the spatial pattern can be generated.

FIG. 5(C) is a diagram illustrating partial matrices of the matrix K equivalent to the spatial pattern. Regarding the matrix K, a partial matrix of a height Hword and a width Wword is considered. Meanwhile, such a partial matrix is also referred to as a "word."

All words are extracted from the matrix K. In the example of the drawing, three extracted words are shown. Each word partly overlaps another word.

In the case of this example, the height and width are set to "3." That is, a case in which a word is set to a matrix of 3×3 is shown. In this manner, when a word is set to a matrix of 3×3, 29=512 kinds of arrangements can be represented by one word.

In this regard, the details are as follows. There are four types of codes as described above. However, there are substantially two types of codes represented next to one type of primitive. This is because the grids are fixed. The grid substantially represents only the position of a primitive, and code information representing a word is two types of primitives. Therefore, 1 bit of information per code is obtained. Therefore, in the case of a word of 3×3, information of two to the ninth power, that is, 9 bits, is obtained, and 512 kinds of expressions can be made by one word.

In the spatial pattern P, codes are disposed so that each word is unique. When a word is set to a matrix of 3×3, the arrangements of words are set not to overlap each other from among 29 kinds.

Regarding a word in which the arrangement of numerical values is unique when all words are extracted, a point (position of the word) in a spatial pattern can be specified.

<D. Uniform Illumination>

Hereinafter, a configuration example in which the photomask 112 out of the lens 113 and the photomask 112 is set as a member of driving target will be described.

FIG. 6 is a diagram illustrating a method of generating uniform illumination. Referring to FIG. 6, the three-dimensional measurement device 1000 (specifically, a control unit 20 to be described later) is assumed to be in a state in which the driving device 114 (see FIG. 3) is stopped in a 3D mode. Thereby, as shown in a state (A), the position of the photomask 112 is fixed. As a result, the three-dimensional measurement device 1000 fixes the image formation position for the light/dark pattern light (light of the spatial pattern P) formed by the photomask 112 at the position of a subject.

Next, when a 2D mode is specified, the three-dimensional measurement device 1000 brings the driving device 114 (see FIG. 3) into operation. Specifically, the three-dimensional measurement device 1000 moves the photomask 112 in a direction perpendicular to the optical axis (an X-axis direction in the drawing). More specifically, the three-dimensional measurement device 1000 vibrates the photomask 112 in the direction perpendicular to the optical axis as shown by an arrow J1.

Thereby, in the 2D mode, the image formation position for the light/dark pattern light changes over time. Therefore, it is possible to perform image capturing (image capturing for two-dimensional measurement) under more uniform illumination than that of irradiation light used during three-dimensional measurement (irradiation light for which the image formation position for the light/dark pattern light does not change over time).

A more detailed description is as follows. In the spatial pattern P, a plurality of words (element patterns) is disposed in a plane as described above. The amplitude of vibration of the photomask 112 is set to be larger than the width of a word in the direction of the amplitude. Meanwhile, in a state (B), the amplitude is set to x4-x2 (or x3-x1).

The position of a word is changed by each word width by vibrating the photomask 112 so as to have such an amplitude. Therefore, according to the three-dimensional measurement device 1000, it is possible to make a light/dark difference caused by spatial pattern light (light/dark pattern light) smaller than in a configuration whose amplitude is smaller than the width of a word. Therefore, it is possible to irradiate a subject with more uniform light than in a configuration whose amplitude is smaller than the width of a word.

In addition, the three-dimensional measurement device 1000 captures an image of the subject in a state in which the spatial pattern P is projected onto the subject. The period of the vibration of the photomask 112 is set to be shorter than an exposure time in image capturing. The exposure state of the light receiving element 121 is maintained during at least one period by setting the period of the vibration in this manner. Therefore, according to the three-dimensional measurement device 1000, it is possible to make a light/dark difference caused by spatial pattern light smaller than in a configuration whose period is longer than an exposure time. Therefore, it is possible to irradiate a subject with more uniform light than in a configuration whose period is longer than the exposure time. Meanwhile, it is more preferable from the viewpoint of uniformity that a value obtained by multiplying the period of the vibration by an integer be an exposure time in image capturing.

As described above, it is possible to make the light/dark difference caused by the light/dark pattern light smaller than in the 3D mode by moving the photomask 112 in the direction perpendicular to the optical axis. Therefore, the 2D mode is specified, so that it is possible to perform image capturing (image capturing for two-dimensional measurement) under more uniform illumination than that of irradiation light used during three-dimensional measurement (in the 3D mode). In addition, in the three-dimensional measurement device 1000, it is possible to switch between three-dimensional measurement and two-dimensional measurement depending on whether the photomask 112 is driven or not.

<E. Functional Configuration>

Figure 7:
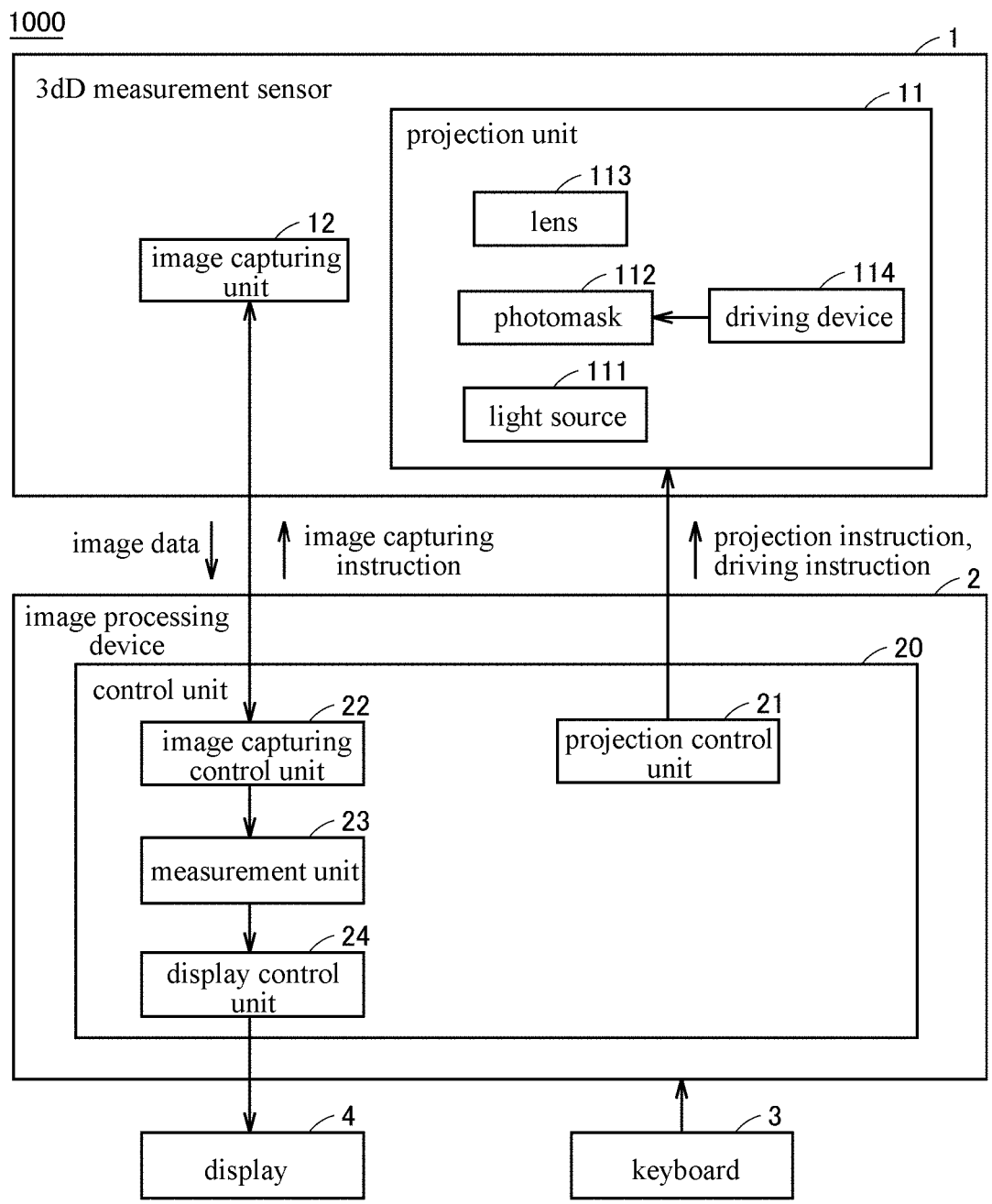
FIG. 7 is a block diagram illustrating a functional configuration of the three-dimensional measurement device.

FIG. 7 is a block diagram illustrating a functional configuration of the three-dimensional measurement device 1000.

Referring to FIG. 7, the three-dimensional measurement device 1000 includes the 3D measurement sensor 1, the image processing device 2, the display 3, and the keyboard 4, as described above.

The 3D measurement sensor 1 includes the projection unit 11 and the image capturing unit 12, as described above (see FIG. 3). The projection unit 11 includes the light source 111, the photomask 112, the lens 113, and the driving device 114, as described above.

The image processing device 2 includes a control unit 20. The control unit 20 includes a projection control unit 21, an image capturing control unit 22, a measurement unit 23, and a display control unit 24.

The control unit 20 controls an overall operation of the image processing device 2. The control unit 20 accepts an input from an input device such as the keyboard 3. The control unit 20 accepts an instruction of a 3D mode, an instruction of a 2D mode, or the like, for example, as the input. The control unit 20 executes an operation according to the input. For example, the control unit 20 controls an operation of the 3D measurement sensor 1 and an output to the display 3.

Each process in the control unit 20 is typically realized by a processor (not shown) of the image processing device 2 executing a program stored in advance in a memory (not shown) of the image processing device 2.

The projection control unit 21 controls an operation of the projection unit 11. For example, the projection control unit 21 controls turning on and turning off of the light source 111. Further, when an input for specifying the 2D mode is accepted, the projection control unit 21 vibrates the photomask 112 in the direction perpendicular to the optical axis by driving the driving device 114.

The image capturing control unit 22 controls an operation of the image capturing unit 12. For example, the image capturing control unit 22 sends a command of image capturing to the image capturing unit 12, and obtains a captured image from the image capturing unit 12. The image capturing control unit 22 sends the captured image of a subject to the measurement unit 23.

When the 3D mode is specified, the measurement unit 23 detects a pattern appearing in the captured image of the subject, and measures a three-dimensional shape of the subject based on the detection result.

When the 3D mode is specified, the display control unit 24 displays the measurement result of its three-dimensional shape on the display 3. When the 2D mode is specified, the display control unit 24 displays the measurement result of its two-dimensional shape on the display 3.

<F. Control Structure>

Figure 8:
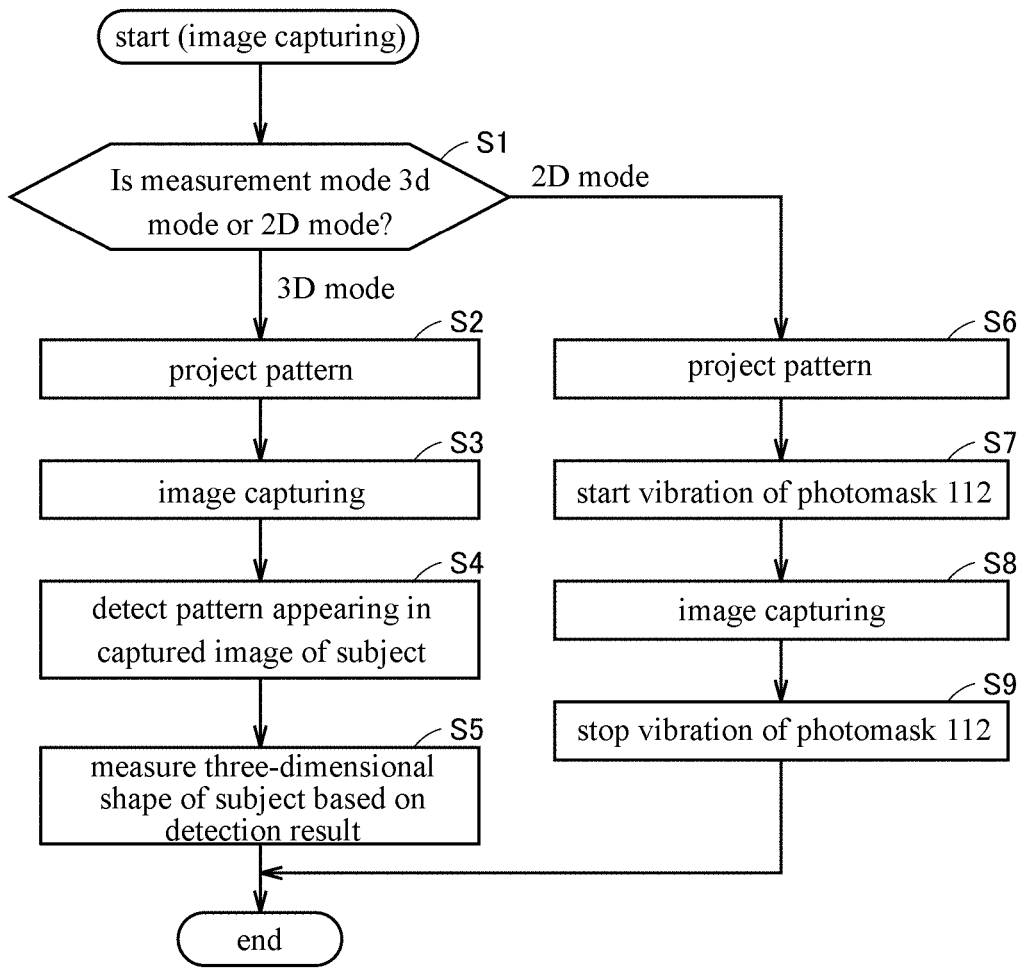
FIG. 8 is a flow diagram illustrating a flow of processes which are executed in the three-dimensional measurement device.

FIG. 8 is a flow diagram illustrating a flow of processes which are executed in the three-dimensional measurement device 1000.

Referring to FIG. 8, in step S1, the control unit 20 determines whether a specified measurement mode is the 3D mode or the 2D mode. When it is determined that the 3D mode is specified, in step S2, the projection unit 11 projects the spatial pattern P onto the subject. In step S3, the image capturing unit 12 captures an image of the subject in a state in which the spatial pattern P is projected onto the subject.

In step S4, the control unit 20 detects a pattern appearing in the captured image of the subject. In step S5, the control unit 20 measures the three-dimensional shape of the subject based on the detection result.

When it is determined in step S1 that the 2D mode is specified, in step S6, the projection unit 11 projects the spatial pattern P onto the subject. In step S7, the control unit 20 vibrates the photomask 112 by the driving device 114. In step S8, the image capturing unit 12 performs image capturing. In step S9, the control unit 20 stops the vibration of the photomask 112.

<G. Modification Example>

FIG. 9 is a diagram illustrating another method of generating uniform illumination. Referring to FIG. 9, the three-dimensional measurement device 1000 (specifically, the control unit 20) is assumed to be in a state in which the driving device 114 (see FIG. 3) is stopped in the 3D mode. Thereby, as shown in a state (A), the position of the photomask 112 is fixed. As a result, the three-dimensional measurement device 1000 fixes the image formation position for the light/dark pattern light (light of the spatial pattern P) formed by the photomask 112 at the position of the subject.

Next, when the 2D mode is specified, the three-dimensional measurement device 1000 brings the driving device 114 into operation. Specifically, the three-dimensional measurement device 1000 moves the photomask 112 in a direction along the optical axis (a Y-axis direction in the drawing). More specifically, the three-dimensional measurement device 1000 vibrates the photomask 112 in the direction along the optical axis as shown by an arrow J2.

In this case, the same effect can also be obtained when the photomask 112 is moved in the direction perpendicular to the optical axis. Meanwhile, the amplitude in this case is y4-y2 (or y3-y1).

Specifically, the amount of movement of the photomask 112 in the direction along the optical axis is set so that the image formation position in the 2D mode falls outside a measurement range in the measurement of a three-dimensional shape when the 3D mode has been specified. According to such a configuration, it is possible to make the light/dark difference caused by the spatial pattern light smaller than when the image formation position in the 2D mode falls within the measurement range. Therefore, it is possible to irradiate the subject with more uniform light than when the image formation position in the 2D mode falls within the measurement range.

[Embodiment 2]

In Embodiment 1, control for varying the position of the photomask 112 in the 2D mode has been performed. In the present embodiment, a configuration in which the position of the lens 113 is varied in the 2D mode will be described.

A three-dimensional measurement device 1000A according to the present embodiment includes a 3D measurement sensor 1A, the image processing device 2, the display 3, and the keyboard 4. The three-dimensional measurement device 1000A is different from the three-dimensional measurement device 1000 according to Embodiment 1 including the 3D measurement sensor 1, in that the 3D measurement sensor 1A is included therein.

<A. 3D Sensor>

Figure 10:
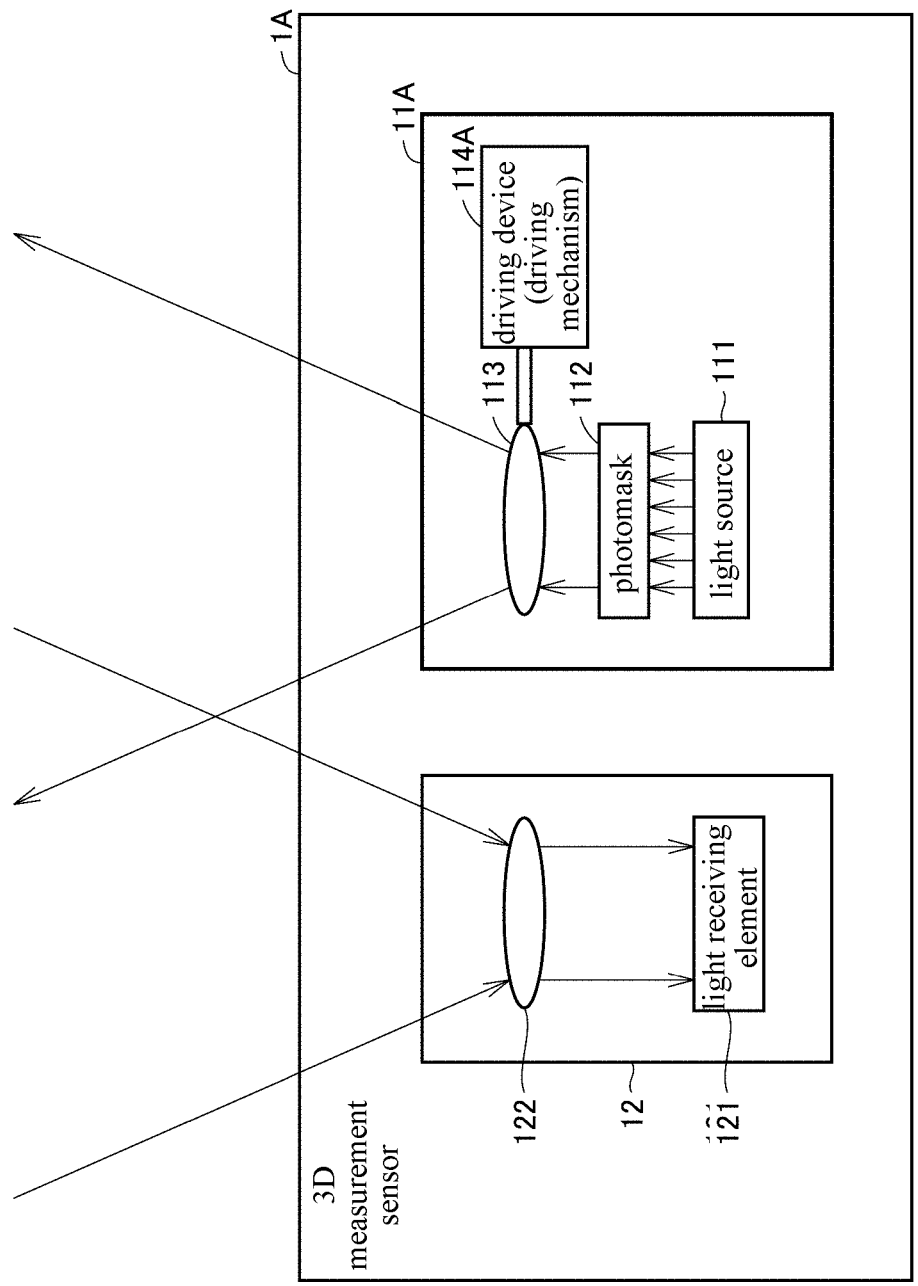
FIG. 10 is a diagram illustrating a schematic configuration of another 3D measurement sensor.

FIG. 10 is a diagram illustrating a schematic configuration of the 3D measurement sensor 1A.

Referring to FIG. 10, the 3D measurement sensor 1A includes a projection unit 11A and the image capturing unit 12.

The projection unit 11A includes the light source 111, the photomask 112, the lens 113, and a driving device 114A. The image capturing unit 12 includes the light receiving element 121 and the lens 122 as described above.

Figure 14:
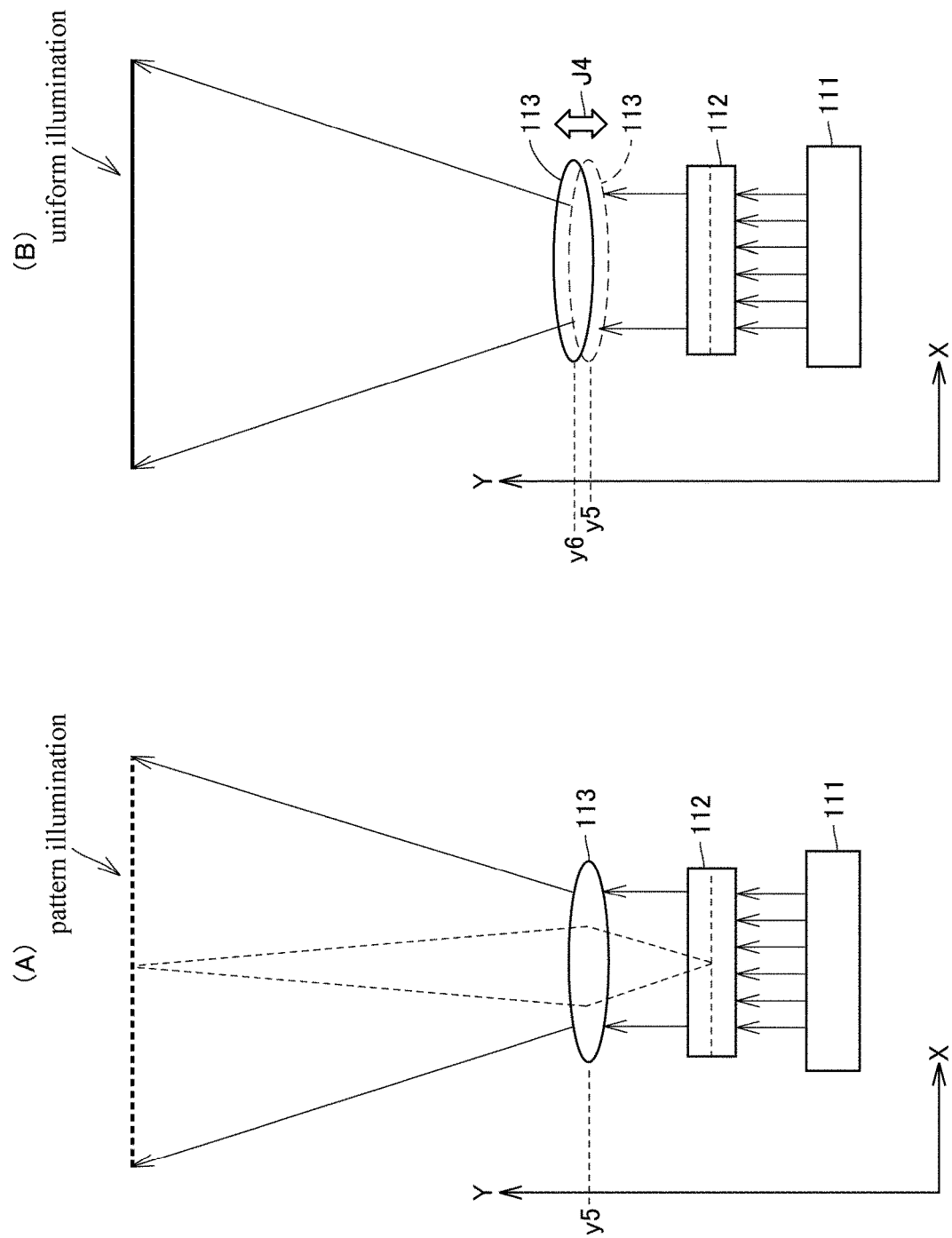
FIG. 14 is a diagram illustrating another method of generating uniform illumination.

The driving device 114A is specifically a driving mechanism. The driving device 114A drives the lens 113 based on instructions from the image processing device 2. The driving device 114A varies the position of the lens 113. Typically, the driving device 114 periodically varies the position of the lens 113 by vibrating the lens 113 with a predetermined period. The movement direction (specifically, amplitude direction) of the lens 113 will be described later (FIGS. 11 and 14).

<B. Uniform Illumination>

Figure 11:
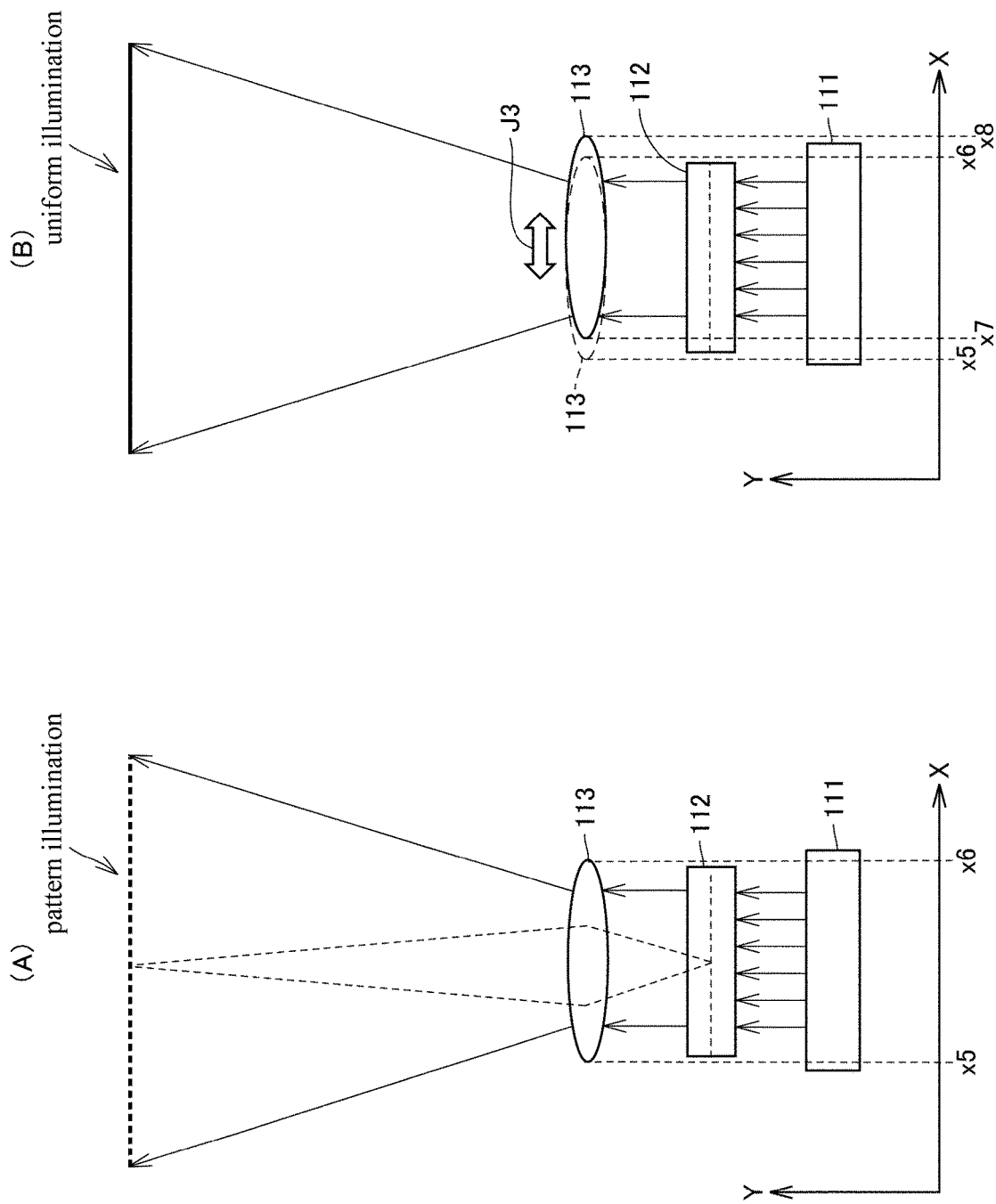
FIG. 11 is a diagram illustrating a method of generating uniform illumination.

FIG. 11 is a diagram illustrating a method of generating uniform illumination. Referring to FIG. 11, the three-dimensional measurement device 1000A (specifically, the control unit 20) is assumed to be in a state in which the driving device 114 (see FIG. 3) is stopped in the 3D mode. Thereby, as shown in a state (A), the position of the lens 113 is fixed. As a result, the three-dimensional measurement device 1000 fixes the image formation position for the light/dark pattern light (light of the spatial pattern P) formed by the photomask 112 at the position of the subject.

Next, when the 2D mode is specified, the three-dimensional measurement device 1000A brings the driving device 114 into operation. Specifically, the three-dimensional measurement device 1000A moves the lens 113 in a direction perpendicular to the optical axis (an X-axis direction in the drawing). More specifically, the three-dimensional measurement device 1000A vibrates the lens 113 in the direction perpendicular to the optical axis as shown by an arrow J3.

Thereby, the image formation position for the light/dark pattern light changes over time. Therefore, it is possible to perform image capturing (image capturing for two-dimensional measurement) under more uniform illumination than that of irradiation light used during three-dimensional measurement (irradiation light for which the image formation position for the light/dark pattern light does not change over time).

A more detailed description is as follows. In the spatial pattern P, a plurality of words (element patterns) is disposed in a plane as described above. The amplitude of vibration of the lens 113 is set to be larger than the width of a word in the direction of the amplitude. Meanwhile, in a state (B), the amplitude is x8-x6 (or x7-x5).

The position of a word is changed by each word width by vibrating the lens 113 so as to have such an amplitude. Therefore, according to the three-dimensional measurement device 1000A, it is possible to make the light/dark difference caused by the spatial pattern light smaller than in a configuration whose amplitude is smaller than the width of a word. Therefore, it is possible to irradiate a subject with more uniform light than in a configuration whose amplitude is smaller than the width of a word.

In addition, the three-dimensional measurement device 1000A captures an image of the subject in a state in which the spatial pattern P is projected onto the subject. The period of the vibration of the photomask 112 is set to be shorter than an exposure time in image capturing. The exposure state of the light receiving element 121 is maintained during at least one period by setting the period of the vibration in this manner. Therefore, according to the three-dimensional measurement device 1000A, it is possible to make a light/dark difference caused by spatial pattern light smaller than in a configuration whose period is longer than an exposure time.

Therefore, it is possible to irradiate a subject with more uniform light than in a configuration whose period is longer than the exposure time.

As described above, it is possible to make the light/dark difference caused by the light/dark pattern light smaller than in the 3D mode by moving the lens 113 in the direction perpendicular to the optical axis. Therefore, the 2D mode is specified, so that it is possible to perform image capturing (image capturing for two-dimensional measurement) under more uniform illumination than that of irradiation light used during three-dimensional measurement (in the 3D mode). In addition, in the three-dimensional measurement device 1000A, it is possible to switch between three-dimensional measurement and two-dimensional measurement depending on whether the lens 113 is driven or not.

<C. Functional Configuration>

Figure 12:
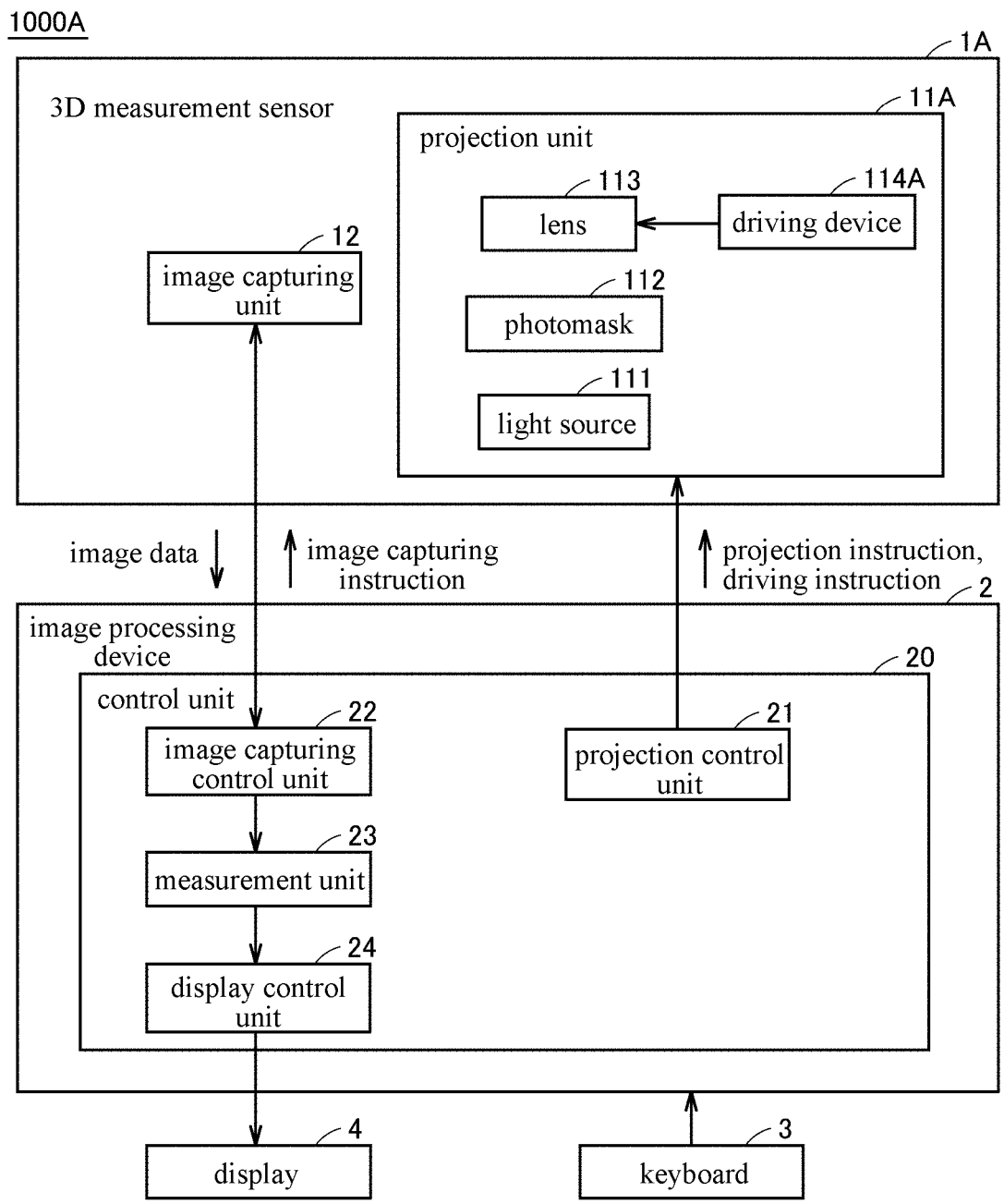
FIG. 12 is a block diagram illustrating a functional configuration of another three-dimensional measurement device.

FIG. 12 is a block diagram illustrating a functional configuration of the three-dimensional measurement device 1000A.

Referring to FIG. 12, the three-dimensional measurement device 1000A includes the 3D measurement sensor 1, the image processing device 2, the display 3, and the keyboard 4, as described above.

The 3D measurement sensor 1A includes the projection unit 11A and the image capturing unit 12. The projection unit 11A includes the light source 111, the photomask 112, the lens 113, and the driving device 114A.

In the present embodiment, the projection control unit 21 of the control unit 20 controls an operation of the projection unit 11A. For example, the projection control unit 21 controls turning on and turning off of the light source 111. Further, when an input for specifying the 2D mode is accepted, the projection control unit 21 vibrates the photomask 112 in the direction perpendicular to the optical axis by driving the driving device 114A.

<D. Control Structure>

Figure 13:
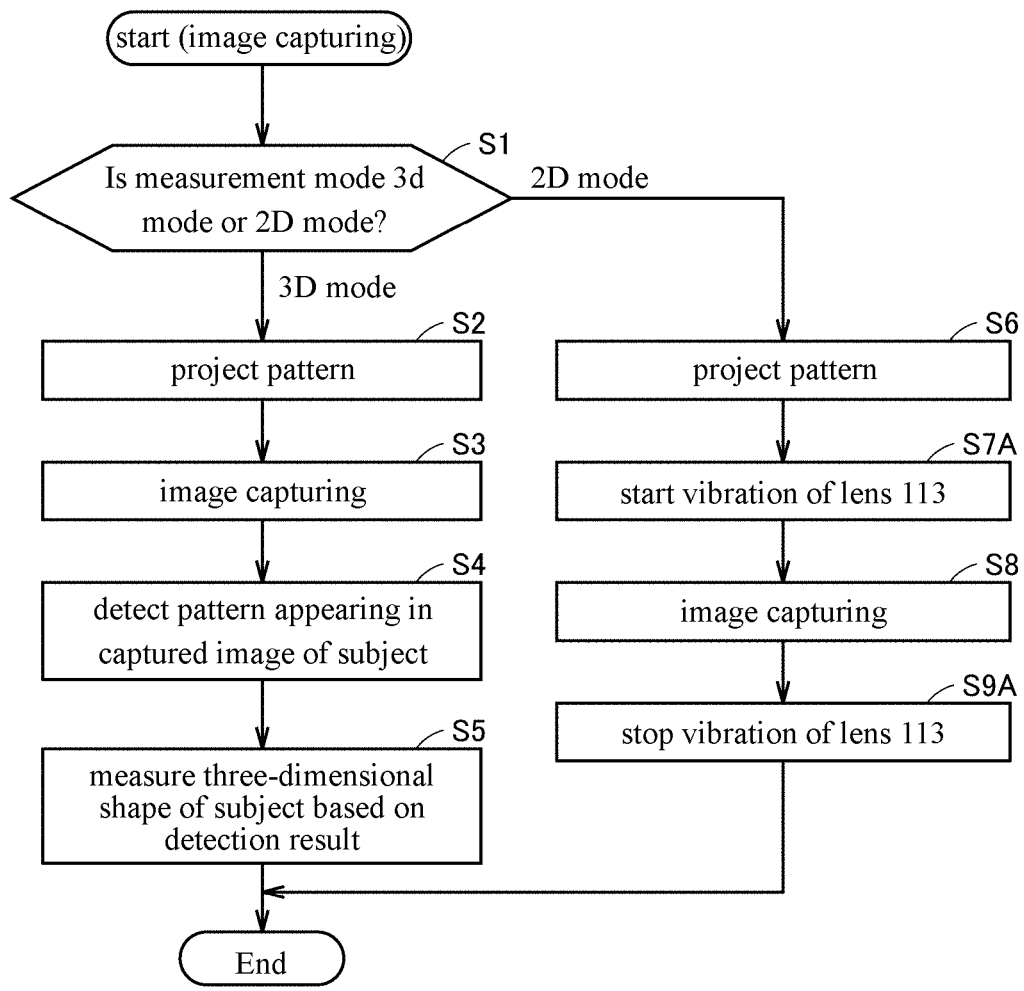
FIG. 13 is a flow diagram illustrating a flow of processes which are executed in another three-dimensional measurement device.

FIG. 13 is a flow diagram illustrating a flow of processes which are executed in the three-dimensional measurement device 1000A.

Referring to FIG. 13, a flow of processes described in in the present embodiment is different from that in Embodiment 1, in that the present embodiment has step S7A instead of step S7 (FIG. 8) and has step S8A instead of step S8 (FIG. 8). Hereinafter, a description will be given with focus on a case in which the 2D mode is specified.

When it is determined in step S1 that the 2D mode is specified, in step S6, the projection unit 11A projects the spatial pattern P onto the subject. In step S7A, the control unit 20 vibrates the lens 113 by the driving device 114A. In step S8, the image capturing unit 12 performs image capturing. In step S9A, the control unit 20 stops the vibration of the lens 113.

<E. Modification Example>

FIG. 14 is a diagram illustrating another method of generating uniform illumination. Referring to FIG. 14, the three-dimensional measurement device 1000A (specifically, the control unit 20) is assumed to be in a state in which the driving device 114A is stopped in the 3D mode. Thereby, as shown in a state (A), the position of the lens 113 is fixed. As a result, the three-dimensional measurement device 1000 fixes the image formation position for the light/dark pattern light (light of the spatial pattern P) formed by the photomask 112 at the position of the subject.

Next, when the 2D mode is specified, the three-dimensional measurement device 1000A brings the driving device 114A into operation. Specifically, the three-dimensional measurement device 1000A moves the lens 113 in a direction along the optical axis (a Y-axis direction in the drawing). More specifically, the three-dimensional measurement device 1000 vibrates the lens 113 in the direction along the optical axis as shown by an arrow J4.

In this case, the same effect can also be obtained when the lens 113 is moved in the direction perpendicular to the optical axis. Meanwhile, the amplitude in this case is y6-y5.

Specifically, the amount of movement of the lens 113 in the direction along the optical axis is set so that the image formation position in the 2D mode falls outside a measurement range in the measurement of a three-dimensional shape when the 3D mode has been specified. According to such a configuration, it is possible to make the light/dark difference caused by the spatial pattern light smaller than when the image formation position in the 2D mode falls within the measurement range. Therefore, it is possible to irradiate the subject with more uniform light than when the image formation position in the 2D mode falls within the measurement range.

[Embodiment 3]

In Embodiment 2, a configuration in which the position of the lens 113 is varied in the 2D mode by the driving device 114A which is a driving mechanism to be mechanically driven has been described. In the present embodiment, a configuration in which mechanical drive is not performed will be described. Specifically, in the present embodiment, a configuration in which the position of a lens is not varied will be described.

In the present embodiment, a liquid lens is used instead of the lens 113. Meanwhile, hereinafter, differences from the three-dimensional measurement devices 1000 and 1000A described in Embodiments 1 and 2 will be mainly described.

Figure 15:
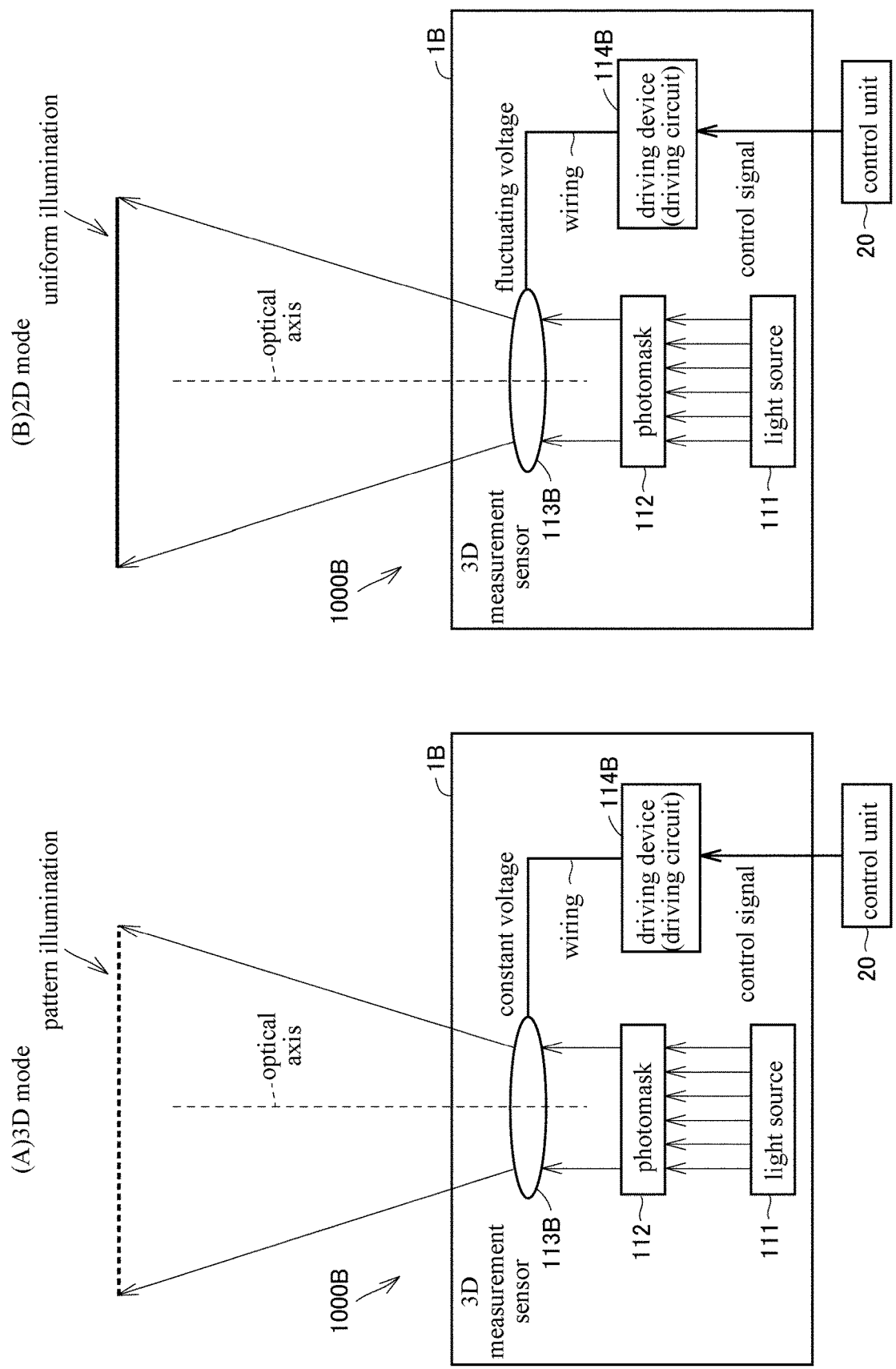
FIG. 15 is a diagram illustrating an outline of processing in still another three-dimensional measurement device.

FIG. 15 is a diagram illustrating an outline of processing in a three-dimensional measurement device 1000B according to the present embodiment. As shown in FIG. 15, the three-dimensional measurement device 1000B includes the light source 111, the photomask 112, a lens 113B, a drive device 114B, and the control unit 20.

The lens 113B is a liquid lens that varies a focal length in accordance with a drive voltage to be applied. The lens 113B guides light from the light source 111 to a subject. The photomask 112 is disposed on an optical axis between the light source 111 and the lens 113B, and has the spatial pattern P formed thereon.

The lens 113B becomes the smallest in focal length in a state where the driving voltage is not applied thereto. The lens 113B becomes the largest in focal length when a sufficiently high driving voltage is applied thereto.

The driving device 114B varies the optical characteristics of the lens 113B. Specifically, the driving device 114B is a driving circuit that applies the driving voltage to the lens 113B.

The driving device 114B maintains a constant value of the driving voltage in the 3D mode. Meanwhile, maintaining a constant value also includes setting a voltage value to 0.

The driving device 114B fluctuates the driving voltage in the 2D mode. Specifically, the driving device 114B periodically varies the driving voltage in the 2D mode. The driving device 114B repeats the rise and fall of the driving voltage at short intervals of time. The driving device 114B fluctuates the driving voltage, so that the optical characteristics of the lens 113B change. A focal length changes due to a change in the optical characteristics. Meanwhile, the fluctuation period of the driving voltage is preferably set to be the same as, for example, the vibration period of the lens 113 in Embodiment 2.

The control unit 20 controls the driving device 114B. When the 3D mode is specified, the control unit 20 fixes the optical characteristics of the lens 113B, as shown in a state (A), to fix the image formation position for the light/dark pattern light (pattern illumination light or spatial pattern light) formed by the photomask 112 at the position of the subject.

When the 2D mode is specified, the control unit 20 performs control for varying the optical characteristics of the lens 113B, as shown in a state (B), to vary the image formation position for the light/dark pattern light so that the light/dark difference is smaller than in the 3D mode (so that, preferably, a change in spatial brightness caused by the light/dark pattern light does not occur on the surface of the subject).

With such a configuration, similarly to Embodiments 1 and 2, in the 2D mode, it is also possible to perform image capturing (image capturing for two-dimensional measurement) under more uniform illumination than in the 3D mode.

<Addition>

[Configuration 1]

A three-dimensional measurement device (1000, 1000A, 1000B) comprising:

a light source (111);

a lens (113, 113B) that guides light from the light source (111) to a subject;

a photomask (112) which is disposed on an optical axis between the light source (111) and the lens (113, 113B) and has a predetermined pattern (P) formed thereon;

a driving device (114, 114A, 114B) that varies a position of at least one member of the lens (113) and the photomask (112) or optical characteristics of the lens (113B); and a control unit (20) that controls the driving device (114, 114A, 114B), wherein the control unit (20) has a first mode and a second mode, when the first mode is specified, the control unit fixes the position of the member or the optical characteristics of the lens (113B) to fix an image formation position for light/dark pattern light formed by the photomask (112) at a position of the subject, and when the second mode is specified, the control unit performs control for varying the position of the member or the optical characteristics of the lens (113B) to vary the image formation position for the light/dark pattern light so that a light/dark difference caused by the light/dark pattern light is smaller than in the first mode.

[Configuration 2]

The three-dimensional measurement device (1000, 1000A) according to configuration 1, wherein the control unit (20) moves the member in a direction perpendicular to the optical axis in the second mode.

[Configuration 3]

The three-dimensional measurement device (1000, 1000A) according to configuration 2, wherein the control unit (20) vibrates the member in the direction perpendicular to the optical axis in the second mode.

[Configuration 4]

The three-dimensional measurement device (1000, 1000A) according to configuration 3, wherein a plurality of element patterns is disposed in a plane in the pattern (P), and an amplitude of the vibration is larger than a width of the element pattern in a direction of the amplitude.

[Configuration 5]

The three-dimensional measurement device (1000, 1000A) according to configuration 3 or 4, further comprising an image capturing unit (12) that captures an image of the subject in a state in which the pattern (P) is projected onto the subject, wherein a period of the vibration is shorter than an exposure time in the image capturing.

[Configuration 6]

The three-dimensional measurement device (1000, 1000A) according to configuration 1, wherein, when the second mode is specified, the control unit (20) moves the member in a direction along the optical axis.

[Configuration 7]

The three-dimensional measurement device (1000, 1000A) according to configuration 6, further comprising an image capturing unit (12) that captures an image of the subject in a state in which the pattern (P) is projected onto the subject, wherein, on a condition that the first mode is specified, the control unit (20) detects a pattern appearing in a captured image of the subject and measures a three-dimensional shape of the subject based on a result of the detection, and an amount of movement of the member in the direction along the optical axis when the second mode has been specified is set so that an image formation position in the second mode falls outside a measurement range in measurement of the three-dimensional shape when the first mode has been specified.

[Configuration 8]

The three-dimensional measurement device (1000B) according to configuration 1, wherein the lens (113B) is a liquid lens that varies a focal length in accordance with a driving voltage to be applied, and the driving device (114B) is a driving circuit that applies the driving voltage to the liquid lens, maintains the driving voltage to be a constant value in the first mode, and fluctuates the driving voltage in the second mode.

[Configuration 9]

A sensor device for three-dimensional measurement (1, 1A, 1B), comprising:

a light source (111);

a lens (113, 113B) that guides light from the light source (111) to a subject;

a photomask (112) which is disposed on an optical axis between the light source (111) and the lens (113, 113B) and has a predetermined pattern formed thereon; and a driving device (114, 114A, 114B) that varies a position of at least one member of the lens (113) and the photomask (112) or optical characteristics of the lens (113B), wherein the sensor device (1, 1A, 1B)

fixes the position of the member or the optical characteristics of the lens (113B), in a first mode, to fix an image formation position for light/dark pattern light formed by the photomask (112) at a position of the subject, and varies the position of the member or the optical characteristics of the lens (113B) by the driving device (114, 114A, 114B), in a second mode, to vary the image formation position for the light/dark pattern light so that a light/dark difference caused by the light/dark pattern light is smaller than in the first mode.

[Configuration 10]

A method for performing control in a three-dimensional measurement device (1000, 1000A, 1000B), wherein the three-dimensional measurement device (1000, 1000A, 1000B) includes a lens (113, 113B) that guides light from a light source (111) to a subject and a photomask (112) which is disposed on an optical axis between the light source (111) and the lens (113, 113B) and has a predetermined pattern (P) formed thereon, and varies a position of at least one member of the lens (113) and the photomask (112) or optical characteristics of the lens (113B), and the control method comprises:

a step of accepting a specification of any of a first mode and a second mode;

a step of fixing the position of the member or the optical characteristics of the lens (113B) based on the first mode having been specified to fix an image formation position for light/dark pattern light formed by the photomask (112) at a position of the subject; and a step of performing control for varying the position of the member or the optical characteristics of the lens (113B) based on the second mode having been specified to vary the image formation position for the light/dark pattern light so that a light/dark difference caused by the light/dark pattern light is smaller than in the first mode.

It is noted that the embodiment disclosed herein is merely illustrative in all aspects and should not be recognized as being restrictive. The scope of the present invention is defined by the scope of claims rather than the description of the embodiment stated above, and is intended to include meanings equivalent to the scope of claims and all modifications within the scope.

What is claimed is:

1. A three-dimensional measurement device comprising:
a light source;
a lens that guides light from the light source to a subject;
a photomask which is disposed on an optical axis between the light source and the lens and has a predetermined pattern formed thereon;
a driving device that varies a position of at least one member of the lens and the photomask or optical characteristics of the lens; and
a control unit that controls the driving device,
wherein the control unit has a first mode and a second mode,
when the first mode is specified, the control unit fixes the position of the member or the optical characteristics of the lens to fix an image formation position for light/dark pattern light formed by the photomask at a position of the subject, and
when the second mode is specified, the control unit performs control for varying the position of the member or the optical characteristics of the lens to vary the image formation position for the light/dark pattern light so that a light/dark difference caused by the light/dark pattern light is smaller than in the first mode.

2. The three-dimensional measurement device according to claim 1, wherein the control unit moves the member in a direction perpendicular to the optical axis in the second mode.

3. The three-dimensional measurement device according to claim 2, wherein the control unit make the member in vibration in the direction perpendicular to the optical axis in the second mode.

4. The three-dimensional measurement device according to claim 3, wherein a plurality of element patterns is disposed in a plane in the pattern, and an amplitude of the vibration is larger than a width of the element pattern in a direction of the amplitude.

5. The three-dimensional measurement device according to claim 3 or 4, further comprising an image capturing unit that captures an image of the subject in a state in which the pattern is projected onto the subject, wherein a period of the vibration is shorter than an exposure time in capturing image.

6. The three-dimensional measurement device according to claim 1, wherein, when the second mode is specified, the control unit moves the member in a direction along the optical axis.

7. The three-dimensional measurement device according to claim 6, further comprising an image capturing unit that captures an image of the subject in a state in which the pattern is projected onto the subject, wherein, on a condition that the first mode is specified, the control unit detects a pattern appearing in a captured image of the subject and measures a three-dimensional shape of the subject based on a detection result, and an amount of movement of the member in the direction along the optical axis when the second mode has been specified is set so that an image formation position in the second mode falls outside a measurement range in measurement of the three-dimensional shape when the first mode has been specified.

8. The three-dimensional measurement device according to claim 1, wherein the lens is a liquid lens that varies a focal length in accordance with a driving voltage to be applied, and the driving device is a driving circuit that applies the driving voltage to the liquid lens, maintains the driving voltage to be a constant value in the first mode, and fluctuates the driving voltage in the second mode.

9. A sensor device for three-dimensional measurement, comprising:

a light source;

a lens that guides light from the light source to a subject;

a photomask which is disposed on an optical axis between the light source and the lens and has a predetermined pattern formed thereon; and a driving device that varies a position of at least one member of the lens and the photomask or optical characteristics of the lens, wherein the sensor device fixes the position of the member or the optical characteristics of the lens, in a first mode, to fix an image formation position for light/dark pattern light formed by the photomask at a position of the subject, and varies the position of the member or the optical characteristics of the lens by the driving device, in a second mode, to vary the image formation position for the light/dark pattern light so that a light/dark difference caused by the light/dark pattern light is smaller than in the first mode.

10. A method for performing control in a three-dimensional measurement device, wherein the three-dimensional measurement device includes a lens that guides light from a light source to a subject; and a photomask which is disposed on an optical axis between the light source and the lens and has a predetermined pattern formed thereon, and varies a position of at least one member of the lens and the photomask or optical characteristics of the lens, the control method comprising:

a step of accepting a specification of any of a first mode and a second mode;

a step of fixing the position of the member or the optical characteristics of the lens based on the first mode having been specified to fix an image formation position for light/dark pattern light formed by the photomask at a position of the subject; and a step of performing control for varying the position of the member or the optical characteristics of the lens based on the second mode having been specified to vary the image formation position for the light/dark pattern light so that a light/dark difference caused by the light/dark pattern light is smaller than in the first mode.

* * * * *